United States Patent Office 2,863,042
Patented Dec. 2, 1958

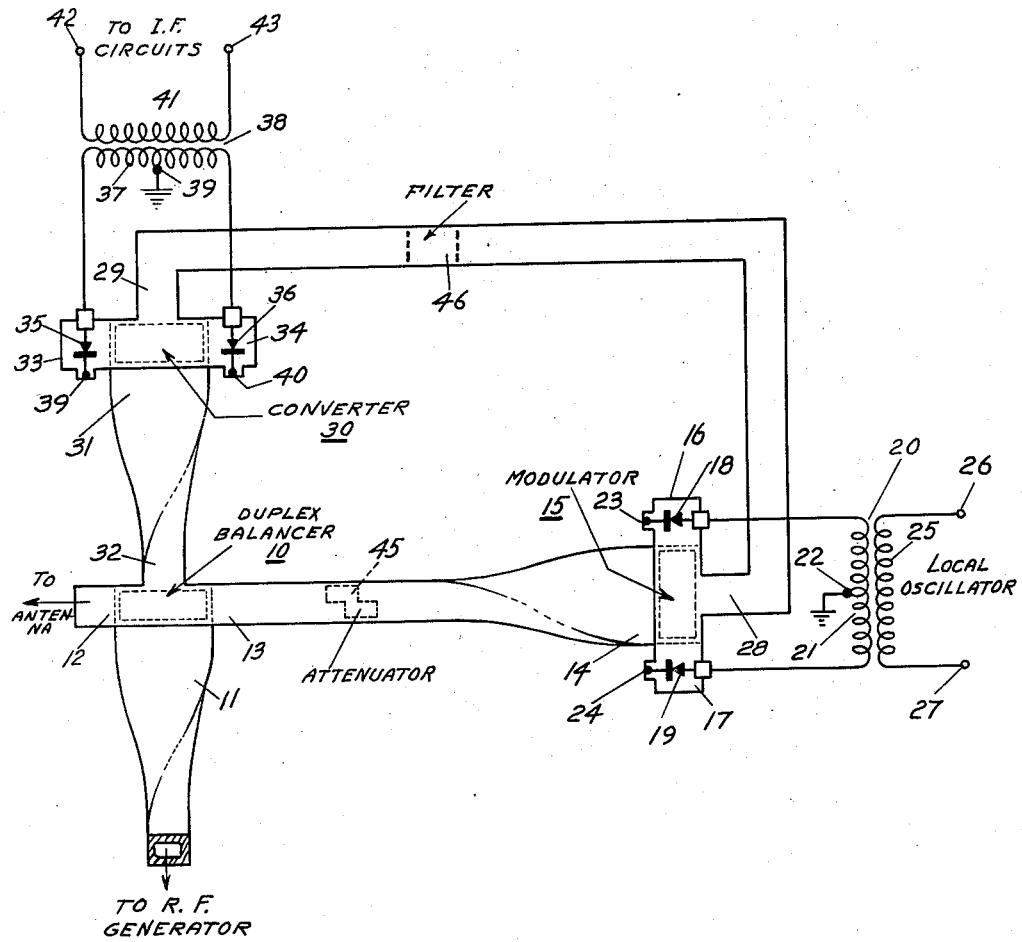

2,863,042

ECHO TRANSMITTER AND RECEIVER HAVING MEANS TO PRODUCE STABLE INTERMEDIATE FREQUENCY DESPITE TRANSMITTER FREQUENCY DRIFT

Royden C. Sanders, Jr., Nashua, N. H., and William R. Mercer, Belmont, Mass., assignors to Raytheon Manufacturing Company, Newton, Mass., a corporation of Delaware Continuation of application Serial No. 186,420, September 23, 1950. This application August 9, 1956, Serial No. 603,131

12 Claims. (Cl. 250—13)

This is a continuation of our application, Serial No. 186,420, filed September 23, 1950, now abandoned.

This invention relates to electrical circuits of the ultra-high frequency kind employing hollow-pipe wave guides as energy-conducting elements, and more particularly to the arrangement of wave-guide elements in such circuits.

In the use of ultra-high frequency electrical energy in radar and like apparatus, the hollow wave guide is extensively employed to fulfill many circuit requirements. Numerous elements have been devised which may be arranged together in groups to provide electrical functions in a desired sequence. The present invention involves such an assembly, wherein a duplex balancer, a modulator and a converter, all constructed of wave guides, are assembled into a single rigid structure which is then available to be connected with a radio frequency generator, an antenna and suitable electronic circuits to provide the R. F. head for a complete radar system. The invention makes use of a wave-guide four-terminal network of a kind having a main wave-guide section with two side arms joined thereto in series and parallel, respectively, at a common plane intermediate the ends thereof. Such a network is described in Patent No. 2,445,895, issued July 27, 1948, to W. A. Tyrell, shows an example of it in Fig. 7 and explains the operation in connection with Figs. 1 to 5, inclusive. Tyrrell has called this device a "duplex balancer." The device shown in Fig. 7 of Tyrrell is also popularly known as a "magic tee," and it will be so referred to herein.

The invention envisions the employment of a first magic tee as a duplex balancer having one side arm available for connection to a radio frequency generator, for example a magnetron, and one of its main arms available for connection to an antenna, together with a second magic tee employed in a modulator circuit and having one of its side arms connected to the remaining main arm of the first magic tee. A third magic tee is employed in a converter circuit, and side arms of the modulator and converter magic tees are connected directly together. The remaining side arm of the converter magic tee is connected to the remaining side arm of the first, or duplex balancer, magic tee.

The foregoing arrangement results in an extremely rigid wave-guide configuration in which, with a few additional elements, a complete R. F. head for a radar system may be provided. Thus, in the connection from the duplex balancer magic tee to the modulator magic tee, an attenuator is inserted which largely absorbs energy arriving from the radio frequency generator, permitting a very small amount to pass into the modulator. In the modulator, a signal from a local oscillator is mixed with this radio frequency generator energy, and two resulting side bands are made available to the converter. The remaining additional element is a filter in the wave guide which connects the modulator and converter magic tees, and has the function of removing one of the side bands. There is thus provided to the converter a signal which is mixed with the received energy arriving from the antenna to provide a signal at an I. F. frequency which is identical to the frequency of the local oscillator, regardless of variations in the frequency of the R. F. generator.

The foregoing and additional advantages of the invention will be more readily appreciated from the following description of a particular embodiment thereof. The description refers to the accompanying drawing, the sole figure of which illustrates the embodiment described.

A first magic tee 10 is employed as a duplex balancer, in accordance with the definition given by Tyrrell in the aforementioned patent, and has its shunt side arm 11 available for connection to an R. F. generator, not shown. One main arm 12 is similarly available for connection to an antenna, not shown. The second main arm 13 of the duplex balancer is connected to the shunt side arm 14 of a second magic tee 15, which is in a modulator circuit of the kind described and claimed in Patent No. 2,468,237, issued April 26, 1949, to the present applicants. As is described in this earlier patent of the applicants, the main arms 16 and 17 of the modulator magic tee 15 have crystals 18 and 19, respectively, similarly disposed therein, and a local oscillator signal is furnished in push-pull to the crystals by means of a transformer 20, the secondary winding 21 of which is connected at its ends to similar sides of the crystals and is grounded at its center 22. The remaining similar sides of the crystals are likewise grounded to the wave guide at points 23 and 24. The local oscillator signal is brought to the primary winding 25 of transformer 20 via primary winding terminals 26 and 27.

The series side arm 28 of the modulator magic tee 15 is connected directly to the series side arm 29 of the converter magic tee 30. The shunt side arm 31 of the converter magic tee and series side arm 32 of the duplex balancer magic tee are directly connected together. The main arms 33 and 34 of the converter magic tee 30 are also provided with similarly arranged crystals 35 and 36, respectively, and like sides of these crystals are connected to the ends of the primary winding 37 of an I. F. transformer 38, the center 39 of which is grounded. The remaining similar sides of the crystals 35 and 36 are grounded to the wave-guide material at points 39 and 40, respectively. The secondary winding 41 of the I. F. transformer 38 may be connected to succeeding I. F. circuits via terminals 42 and 43.

As is explained in the aforementioned patent to Tyrrell, the wave-guide magic tee has the property, when used as a duplex balancer, that power input to any one branch will divide between two of the other three possible paths. Thus, power from the R. F. generator arriving in the duplex balancer magic tee 10 via the shunt side arm 11 will divide between the main arms 12 and 13. In order to prevent power from being fed into the third of the three possible paths, namely, the series side arm 32, the other two paths must be properly terminated, as is well known. If they are not properly terminated, they will reflect energy which, in turn, may appear in a branch which it is desired no energy should enter. Accordingly, the present wave-guide arrangement preferably contains matching devices in each magic tee to match each of the sections properly. The matching technique is well known to those skilled in the art. The principles involved are amply explained in a publication entitled "Microwave Techniques," published by the Navy Department, Bureau of Ships, under the designation "NavShips 900,028," June 15, 1944, pages 33 to 36, inclusive. Power from the R. F. generator thus divides equally between the path to the antenna and the path to the modulator magic tee 15 and, provided these two arms are properly terminated, very little transmitter power will be transferred across the magic tee to the converter, or receiver, crystals 35 and 36. Reflected energy from the target, arriving in the antenna line 12 will be divided equally between the converter, or receiver, crystals and the radio frequency generator line 11, and very little reflected energy will pass into line 13 to the modulator magic tee 15.

The wave-guide arrangement of the present invention is intended for use in radar systems of the continuous wave type, wherein the radio frequency generator is operated constantly, either with or without modulation. Such systems are described in chapter 5 of "Radar System Engineering," vol. 1, of the Massachusetts Institute of Technology Radiation Laboratory Series, published by McGraw-Hill Book Company, Inc., New York, 1947. The reflected energy has information in it which indicates the range rate, or the range and the range rate, depending upon whether or not the radio frequency generator has initially been modulated.

An attenuator 45 is included in the wave guide connecting the shunt side arm 14 of the modulator magic tee 15 with a main arm 13 of the duplex balancer magic tee 10. This attenuator may be of any of the known forms, a large number of which are described in the aforementioned publication "Microwave Techniques" on pages 156 to 159, inclusive. We prefer to use a plug made of polyiron, which is described on page 157 of said publication. The attenuator serves to terminate the line 13 in which it is placed, at the same time permitting the passage of a very small amount of radio frequency generator power to the two main arms of the modulator magic tee 15, wherein the local oscillator modulator crystals 18 and 19 are mounted. The resistance which these crystals present to the wave guide is varied at the local oscillator rate by feeding the push-pull output of the local oscillator to them. This varying of the resistance of the crystals modulates the energy received in this arm from the radio frequency generator, producing two side bands, one above and one below the R. F. generator frequency, by an amount equal to the local oscillator frequency. As is explained in the aforementioned earlier patent of the applicants, essentially carrier-suppressed modulation results, and only the two side bands appear in the series side arm 28 of the modulator magic tee 15.

A side-band filter 46 is included in the wave guide connected between the series side arms 28 and 29 of the modulator and converter magic tees 15 and 30, respectively. This filter may take any form which is suitable to remove one of the aforementioned side bands, while permitting the other to remain substantially unaffected. Filters of wave-guide form which are suitable for this use are shown, for example, in Patent No. 2,432,093, issued December 9, 1947, to A. G. Fox, who illustrates an adjustable band-pass filter in Fig. 10 of this patent, and band-suppression filters in Figs. 19 and 20. The signal which arrives in the converter magic tee 30 thus consists of only one of the aforementioned side bands, and this signal passes to the main arms 33 and 34 in which the converter crystals 35 and 36 are mounted. Preferably, the side-band filter 46 attenuates the high-frequency side band and passes the low-frequency side band to the converter crystals. The low-frequency side band is lower in frequency than the R. F. generator, or transmitted, signal by the local oscillator frequency at any instant and, therefore, becomes the local oscillator signal providing the proper mixing frequency for an I. F. amplifier which is tuned to the same frequency as the local oscillator.

The invention will be more clearly understood if suitable exemplary frequencies are considered. Thus, the R. F. generator may be a 10,000 mc. oscillator, for example a magnetron, while the local oscillator, not shown, may oscillate at the rate of 68 mc. per second. The side bands then furnished by the modulator will be 10,068 mc. and 9,932 mc., per second, respectively. The 10,068 mc. per second signal is filtered out by the filter 46, and the 9,932 mc. per second signal is furnished to the converter. This signal differs by 68 mc. per second from the transmitter frequency of 10,000 mc. per second, and, therefore, received energy arriving by way of the antenna and mixed with it is converted to a 68 mc. per second signal, suitable for use in I. F. circuits which are adjusted for this frequency.

With this type of R. F. system, no other form of automatic frequency control circuit is required. As long as the output frequency of the local oscillator remains constant, the transmitter, or R. F. generator frequency can change without having an appreciable effect on the output of the converter crystals, because the local oscillator voltage for the converter is obtained at any instant by subtracting the output of the modulator local oscillator from the instantaneous transmitter frequency. More particularly, with specific reference to the foregoing frequency signals, the 68 mc. signal of the modulator local oscillator is at all times subtracted from the instantaneous transmitter frequency to provide the converter local oscillator signal, which is thus normally 9,932 mc. per second.

Those skilled in the art will appreciate that many variations of the above-described embodiment of the invention may be made without the exercise of the invention and within the spirit and scope of the present invention. It is, therefore, intended that the claims which follow shall be limited not by the details of the described embodiment, but only by the prior art.

What is claimed is:

1. A wave-guide configuration comprising means for coupling electromagnetic energy to said configuration, a first magic tee, a wave-guide modulator including a second magic tee having nonlinear impedance means in each of its main arms, a wave-guide converter including a third magic tee having nonlinear impedance means in each of its main arms, a connection from a main arm of said first magic tee to one side arm of said second magic tee, a connection from the second side arm of said second magic tee to a first side arm of said third magic tee, and a connection from the second side arm of said third magic tee to a first side arm of said first magic tee.

2. A wave-guide configuration comprising means for coupling electromagnetic energy to said configuration, a first magic tee, a wave-guide modulator including a second magic tee having nonlinear impedance means in each of its main arms, a wave-guide converter including a third magic tee having nonlinear impedance means in each of its main arms, a connection from a main arm of said first magic tee to the shunt side arm of said second magic tee, a connection from the series side arm of said second magic tee to the series side arm of said third magic tee, and a connection from the shunt side arm of said third magic tee to the series side arm of said first magic tee.

3. A wave-guide configuration comprising means for coupling electromagnetic energy to said configuration, a first magic tee, a wave-guide modulator including a second magic tee having similarly arranged nonlinear impedance means in each of its main arms, a wave-guide converter including a third magic tee having nonlinear impedance means in each of its main arms, a first connection from a main arm of said first magic tee to one side arm of said second magic tee, a second connection from the second side arm of said second magic tee to a first side arm of said third magic tee, a third connection from the second side arm of said third magic tee to a first side arm of said first magic tee, means to provide a modulation signal in push-pull to the nonlinear impedance means of said wave-guide modulator, and means in said second connection to suppress one of the side bands resulting when a microwave signal introduced into said modulator via said one side arm thereof is modulated by said modulation signal.

4. A wave-guide configuration comprising means for coupling electromagnetic energy to said configuration, a first magic tee, a wave-guide modulator including a second magic tee having nonlinear impedance means in each of its main arms, a wave-guide converter including a third magic tee having nonlinear impedance means in each of its main arms, a first connection from a main arm of said first magic tee to one side arm of said second magic tee, a second connection from the second side arm of said second magic tee to a first side arm of said third magic tee, a third connection from the second side arm of said third magic tee to a first side arm of said first magic tee, and attenuator means in series in said first connection.

5. A wave-guide configuration comprising means for coupling electromagnetic energy to said configuration, a first magic tee, a wave-guide modulator including a second magic tee having similarly arranged nonlinear impedance means in each of its main arms, a wave-guide converter including a third magic tee having nonlinear impedance means in each of its main arms, a first connection from a main arm of said first magic tee to one side arm of said second magic tee, a second connection from the second side arm of said second magic tee to a first side arm of said third magic tee, a third connection from the second side arm of said third magic tee to a first side arm of said first magic tee, means to provide a modulation signal in push-pull to the nonlinear impedance means of said wave-guide modulator, means in said second connection to suppress one of the side bands resulting when a microwave signal introduced into said modulator via said one side arm thereof is modulated by said modulation signal, and attenuator means in series in said first connection.

6. In combination, a wave-guide configuration comprising means for coupling electromagnetic energy to said configuration, a first magic tee, a wave-guide modulator including a second magic tee having similarly arranged nonlinear impedance means in each of its main arms, a wave-guide converter including a third magic tee having nonlinear impedance means in each of its main arms, a first connection from a main arm of said first magic tee to one side arm of said second magic tee, a second connection from the second side arm of said second magic tee to a first side arm of said third magic tee, a third connection from the second side arm of said third magic tee to a first side arm of said first magic tee, means to provide a modulation signal in push-pull to the nonlinear impedance means of said wave-guide modulator, a source of microwave energy connected to the second side arm of said first magic tee, and means in said second connection to suppress one of the side bands resulting from modulation of said radio frequency energy with said modulation signal in said modulator.

7. In combination, a wave-guide configuration comprising means for coupling electromagnetic energy to said configuration, a first magic tee, a wave-guide modulator including a second magic tee having nonlinear impedance means in each of its main arms, a wave-guide converter including a third magic tee having nonlinear impedance means in each of its main arms, a connection from a main arm of said first magic tee to one side arm of said second magic tee, a connection from the second side arm of said second magic tee to a first side arm of said third magic tee, a connection from the second side arm of said third magic tee to a first side arm of said first magic tee, the second side arm of said first magic tee being adapted to be connected to a source of radio frequency energy, means to provide a modulation signal to the nonlinear impedance means of said modulator, and output means connected to the nonlinear impedance means of said converter.

8. In a microwave radar system including a source of microwave energy, a first wave-guide four-terminal network having said source connected to one terminal thereof and arranged to divide said energy substantially equally between the second and third terminal thereof, said second terminal being adapted for connection to an antenna, a second wave-guide four-terminal network having its first terminal connected to the third terminal of said first network and arranged to furnish the energy received in its first terminal in substantially equal amounts to its second and third terminals, first and second nonlinear impedances in said second network second and third terminals, respectively, means to provide a modulation signal to said impedances, a third wave-guide four-terminal network, a connection from the fourth terminal of said first network to the first terminal of said third network, said first terminal of said third network being arranged to furnish energy received therein to the second and third terminals thereof in substantially equal amounts, third and fourth nonlinear impedances in said second and third terminals of said third network, output means connected to said third and fourth nonlinear impedances, and a connection from the fourth terminal of said third network to the fourth terminal of said second network.

9. In a microwave radar system including a source of microwave energy, a first wave-guide four-terminal network having said source connected to one terminal thereof and arranged to divide said energy substantially equally between the second and third terminals thereof, said second terminal being adapted for connection to an antenna, a second wave-guide four-terminal network having its first terminal connected to the third terminal of said first network and arranged to furnish the energy received in its first terminal in substantially equal amounts to its second and third terminals, first and second nonlinear impedances in said second network second and third terminals, respectively, means to provide a modulation signal to said impedances, a third wave-guide four-terminal network, a connection from the fourth terminal of said first network to the first terminal of said third network, said first terminal of said third network being arranged to furnish energy received therein to the second and third terminals thereof in substantially equal amounts, third and fourth nonlinear impedances in said second and third terminals of said third network, output means connected to said third and fourth nonlinear impedances, a wave-guide connection from the fourth terminal of said third network to the fourth terminal of said second network, and means in said wave-guide connection to suppress one of the side bands resulting from modulation of said microwave energy with said modulation signal.

10. In a microwave radar system including a source of microwave energy, a first wave-guide four-terminal network having said source connected to one terminal thereof and arranged to divide said energy substantially equally between the second and third terminals thereof, said second terminal being adapted for connection to an antenna, a second wave-guide four-terminal network having its first terminal connected to the third terminal of said first network and arranged to furnish the energy received in its first terminal in substantially equal amounts to its second and third terminals, attenuator means in the connection between said first and second networks, first and second nonlinear impedances in said second network second and third terminals, respectively, means to provide a modulation signal to said impedances, a third wave-guide four-terminal network, a connection from the fourth terminal of said first network to the first terminal of said third network, said first terminal of said third network being arranged to furnish energy received therein to the second and third terminals thereof in substantially equal amounts, third and fourth nonlinear impedances in said second and third terminals of said third network, output means connected to said third and fourth nonlinear impedances, and a connection from the fourth terminal of said third network to the fourth terminal of said second network.

11. In a microwave radar system including a source of microwave energy, a first wave-guide four-terminal network having said source connected to one terminal thereof and arranged to divide said energy substantially equally between the second and third terminals thereof, said second terminal being adapted for connection to an antenna, a second wave-guide four-terminal network having its first terminal connected to the third terminal of said first network and arranged to furnish the energy received in its first terminal in substantially equal amounts to its second and third terminals, attenuator means in the connection between said first and second networks, first and second nonlinear impedances in said second network second and third terminals, respectively, means to provide a modulation signal to said impedances, a third wave-guide four-terminal network, a connection from the fourth terminal of said first network to the first terminal of said third network, said first terminal of said third network being arranged to furnish energy received therein to the second and third terminals thereof in substantially equal amounts, third and fourth nonlinear impedances in said second and third terminals of said third network, output means connected to said third and fourth nonlinear impedances, a wave-guide connection from the fourth terminal of said third network to the fourth terminal of said second network, and means in said wave-guide connection to suppress one of the side bands resulting from modulation of said microwave energy with said modulation signal.

12. A wave-guide configuration comprising means for feeding electromagnetic energy to said configuration, a first wave-guide four-terminal network having a first terminal and arranged to divide energy received therein substantially equally between the second and third terminals thereof, a second wave-guide four-terminal network having its first terminal connected to the third terminal of said first network and arranged to furnish energy received in its first terminal in substantially equal amounts to its second and third terminals, first and second nonlinear impedances in said second network second and third terminals, respectively, a third wave-guide four-terminal network, a connection from the fourth terminal of said first network to the first terminal of said third network, said first terminal of said third network being arranged to furnish energy received therein to the second and third terminals thereof in substantially equal amounts, third and fourth nonlinear impedances in said second and third terminals of said third network, and a connection from the fourth terminal of said third network to the fourth terminal of said second network.

References Cited in the file of this patent

UNITED STATES PATENTS

| | | |
|---|---|---|
| 2,519,369 | Hansen et al. | Aug. 22, 1950 |
| 2,705,752 | Pound | Apr. 5, 1955 |